United States Patent

[11] 3,568,960

| [72] | Inventors | Carl D. Griffith<br>Scottsdale, Ariz.;<br>Victor H. Levi, El Cajon; John S.<br>McBrayer, Woodland, Calif. |
|---|---|---|
| [21] | Appl. No. | 819,906 |
| [22] | Filed | Apr. 28, 1969 |
| [45] | Patented | Mar. 9, 1971 |
| [73] | Assignee | The United States of America as represented by the Secretary of the Army |

[54] HELICOPTER FLIGHT CONTROL SYSTEM
10 Claims, 1 Drawing Fig.

[52] U.S. Cl. ................................................. 244/77
[51] Int. Cl. ................................................. B64c 17/00
[50] Field of Search .......................................... 244/77, 77
(B), 77 (D), 77 (E), 77 (F), 77 (DZ), (Inquired)

[56] References Cited
UNITED STATES PATENTS
3,058,700  10/1962  Hecht .......................... 244/77

3,386,689  6/1968  Parker et al. ................. 244/77
3,467,344  9/1969  Kramer et al. ................ 244/77

*Primary Examiner*—Milton Buchler
*Assistant Examiner*—James E. Pittenger
*Attorneys*—Harry M. Saragovitz, Edward J. Kelly, Herbert Berl and Jess J. Smith, Jr.

ABSTRACT: This invention relates to a heading control system for flight control of a helicopter of the single rotor type. Nonsimilar, redundant signals from a directional gyro are separately processed in a nonlinear manner so as to produce a more accurate and rapid trim response. One of the redundant signals, responsive to heading error, is processed and fed to a nonlinear gain element. The other of the redundant signals, responsive to heading rate of change, is processed and fed to a deadzone, nonlinear gain element. The redundant signals are then combined and subsequently fed to the trim servo.

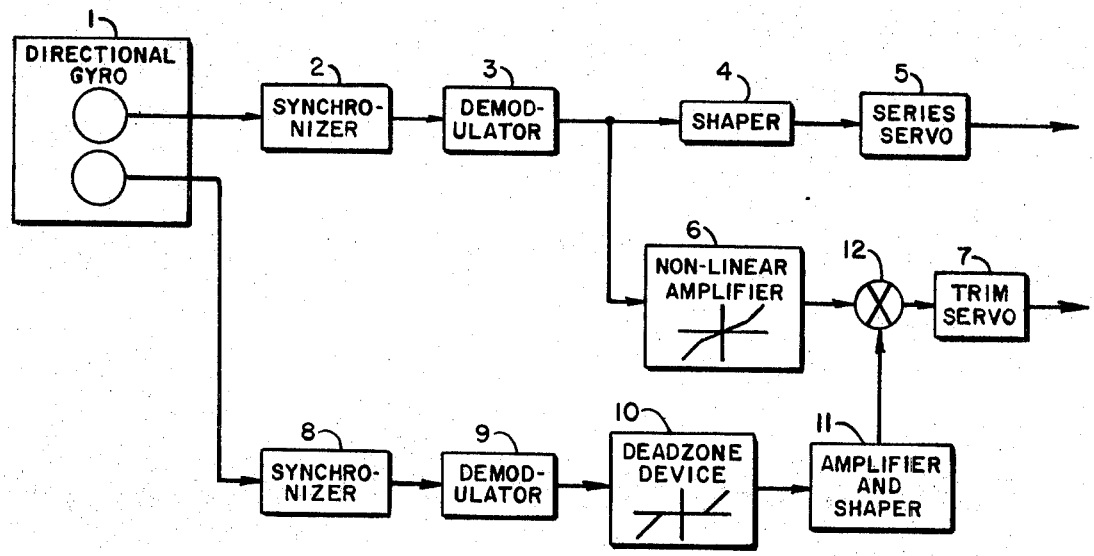
INVENTORS,
CARL D. GRIFFITH
VICTOR H. LEVI
JOHN S. McBRAYER.
ATTORNEYS

HELICOPTER FLIGHT CONTROL SYSTEM

BACKGROUND OF THE INVENTION

Broadly, the instant invention relates to a control system for heavier-than-air aircraft. More particularly, it relates to a heading hold system useful in helicopters of the single rotor type but useful in other type vehicles when the heading hold feature is desired. In helicopters of the type for which the disclosed invention has been successfully employed, a single large rotor controls the lift and forward speed of the helicopter. The blades of the single large rotor are varied in pitch thereby effecting lift and the plane of rotation of the blade is changed, thereby effecting the forward speed of the helicopter. An undesirably byproduct of using a single rotor is the necessity of control of the torque generated by the helicopter drive mechanism or power supply to the rotor. The torque produced tends to cause the heading of the helicopter to move about a vertical axis commonly known as the yaw axis and an auxiliary rotor is generally employed to offset this torque.

The particular invention disclosed herein is concerned with maintaining the heading of the aircraft in a desired direction and to provide suitable heading control to the helicopter for very large upsets about the yaw axis.

Numerous helicopter flight control systems have been developed including those with various feedback arrangements wherein a desired heading is selected and a heading error signal is detected, amplified and processed in such a manner as to control the aircraft heading. Other devices have been developed that provide systems of control with a similar redundancy so that the aircraft or helicopter will still have heading or flight control in the event of a failure of one of the systems or elements therein. It is not too uncommon to see the use of what is known as dead-spot or dead-zone amplifiers (essentially a double anode zener diode) in aircraft control systems where nonlinear output is desired. Such systems are often somewhat complicated and are often expensive to construct.

SUMMARY OF THE INVENTION

It is the general purpose of the instant invention to provide a system for helicopter flight control that maintains a desired heading, is comparatively simple and reacts in such a manner as to give adequate heading control even for very large upsets. Essentially, heading error and heading rate signals are processed in a nonlinear fashion and subsequently combined to drive a trim servo in response to changing trim conditions. The trim speed limits are increased in the device of the instant invention and, by the use of nonsimilar redundancy, a hardover (system failure giving maximum signal output from the failed device) signal is partly canceled out by the signal in the other system. This particular technique offers advantages over other known methods, of flight control systems of this type, particularly with respect to improved system reliability, performance and simplified system design.

BRIEF DESCRIPTION OF THE DRAWING

The single figure shows a block diagram of the instant invention showing the two signal paths of the heading information coming from the directional gyro.

DESCRIPTION OF THE PREFERRED EMBODIMENT

Referring now to the single figure, there is seen a block diagram of the instant invention wherein directional gyro 1 is provided with dual output transducers. The conventional method of heading control is through synchronizer 2 which is clamped at the reference heading thereby giving a heading error signal. This synchronized heading signal is subsequently processed in demodulator 3, shaping element 4, and applied to the series servo 5 (an automatic flight control servo) for short term heading damping and control. The demodulated heading error signal is also applied to the trim servo 7 to provide integral control of heading and to keep the series servo 5 operating about its midpoint in a steady-state condition. The additional components which make up the subject of this invention are the provisions of a second output transducer in directional gyro 1, nonlinear gain element 6, and the second trim signal path through blocks 8—11. The trim gain around null as set by element 6 is adjusted to provide stable operation, but increased gain is required when a heading error signal is present outside of the gain around null in order to give the heading trim servo 7 an increased signal thereby taking advantage of the increased trim rate of trim servo 7. The higher trim gain, however, causes unstable heading control when operating in this out-of-null region, since for this magnitude heading error the series servo 5 is operating at its displacement limit. The second trim signal path thus provides the needed trim damping when the heading error signal is in the out-of-null condition.

The synchronizer 8 is kept in a slow followup mode, thereby providing a heading rate signal (as opposed to the heading error signal heretofore described) to demodulator 9. Deadzone 10 prevents any signals from being applied to the trim through this path when operating around null, that is, when nonlinear gain 6 is operating in its low gain region. The heading rate signal is then further shaped and amplified at 11 to produce a derived heading acceleration signal which is summed at 12 with the heading error signal into the trim servo. Thus, for small heading errors, the system behaves like a conventional heading control system, but for larger errors the heading gain to the trim servo is increased to provide rapid corrections and additional acceleration damping is provided to prevent overshoots. Also, in the event of a hardover failure in either transducer or the directional gyro, or in any element of each of the paths, the other path prevents excessive trim reaction that might otherwise cause the pilot to lose control of the craft. Of course, if a hardover failure occurred in the directional gyro or the trim servo, the signal from the other path would not be present to override such a failure, but these failures are eliminated by providing fail safe designs to each of these components or redundant equipment that becomes operative upon the failure of its like equipment. The system disclosed also continues to function if one of the signal paths is interrupted thereby giving a zero or no output since the other signal path continues to operate. The system then either functions as the conventional trim servo system or one employing only the heading error rate.

It should be understood, of course, that the foregoing disclosure relates to only a preferred embodiment of the invention and that numerous modifications or alterations may be made without departing from the spirit and the scope of the invention as set forth in the appended claims.

I claim:

1. A method of controlling the heading of an aircraft comprising the steps of:
    processing a heading error signal through one path to control a trim servo; and
    processing a heading rate signal through another path in such a manner as to control said trim servo when said heading rate signal exceeds predetermined limits thereby controlling the heading of an aircraft when one path of said processed signal fails as well as when said processed signals properly function.

2. The method of controlling the heading of an aircraft according to claim 1 and further including the step of:
    combining said processed signals before they are employed to control said trim servo.

3. An aircraft flight control system comprising:
    a first means for detecting variation in heading of an aircraft from a predetermined reference heading;
    a trim servo;
    a first signal processing means for applying said variation in heading to said trim servo;
    a second means for detecting the rate of variation in heading of said aircraft from said predetermined reference heading, and;

a second signal processing means for applying said rate of variation to said trim servo thereby controlling the heading of the aircraft about a predetermined reference heading when one of said signal processing means fails as well as when said signal processing means properly function.

4. An aircraft flight control system according to claim 3, and further comprising:
means for combining said first means for detecting heading variations and said second means for detecting heading rate variations in such a manner that said detected heading variations and said rate variations jointly effect control of said trim servo.

5. An aircraft flight control system according to claim 4, and further comprising that said second signal processing means is effective only when said heading variation is out of a predetermined range.

6. An aircraft flight control system according to claim 3 wherein said first signal processing means contains a nonlinear amplifier.

7. An aircraft flight control system according to claim 3 wherein said second signal processing means contains a deadspot amplifier.

8. An aircraft flight control system according to claim 3 wherein said first signal processing means contains a nonlinear amplifier and said second signal processing means contains a deadspot amplifier.

9. An aircraft flight control system according to claim 5 wherein said first signal processing means contains a nonlinear amplifier and said second signal processing means contains a deadspot amplifier.

10. An aircraft flight control system according to claim 9 and further comprising a series servo with a separate output connected to said first signal processing means before said nonlinear amplifier.